Dec. 29, 1925.
S. J. EPARD ET AL
1,567,252
WINDSHIELD GUARD
Filed Oct. 29, 1923
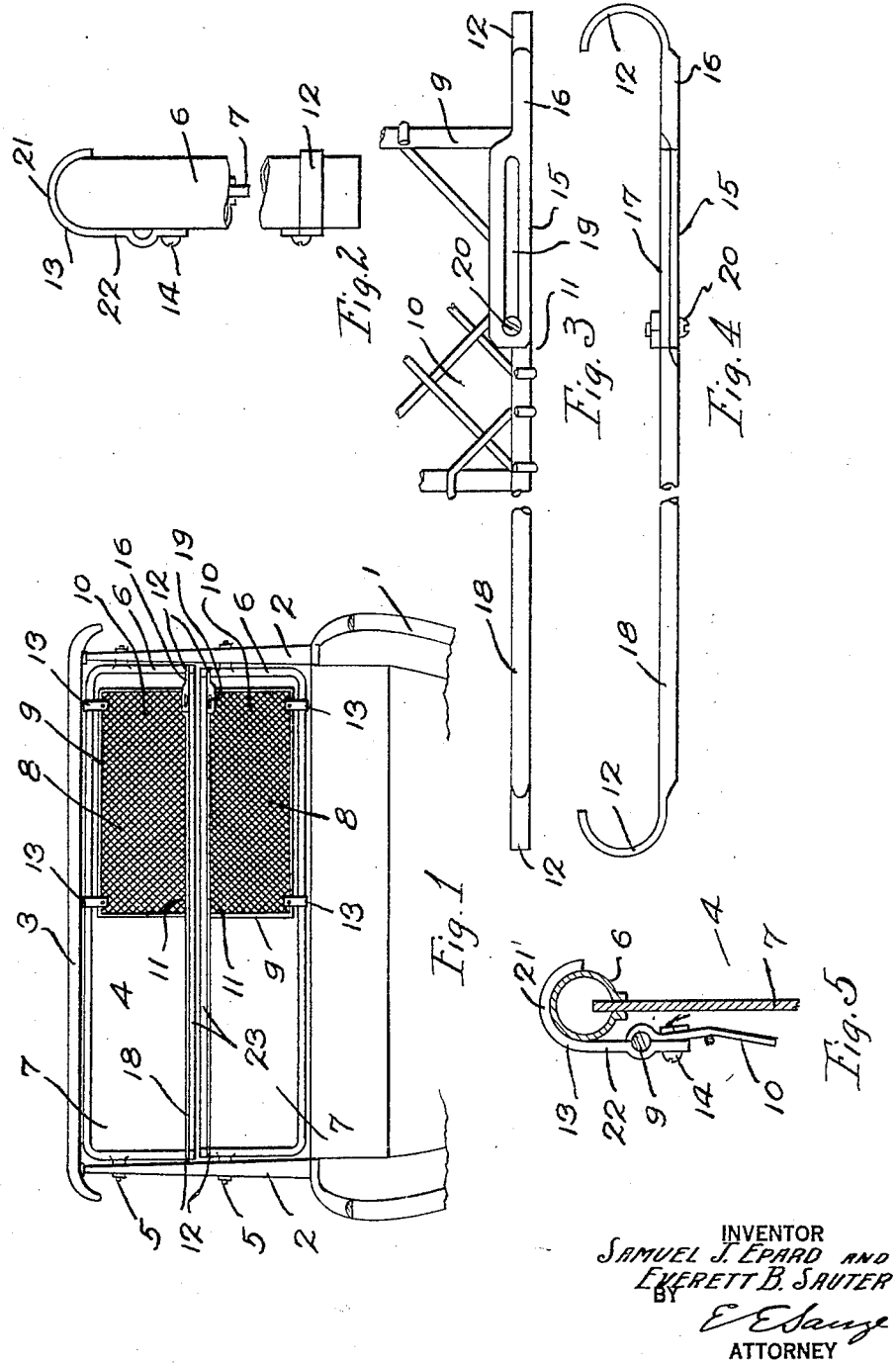
INVENTOR
SAMUEL J. EPARD AND
EVERETT B. SAUTER
BY
ATTORNEY Patented Dec. 29, 1925.

1,567,252

UNITED STATES PATENT OFFICE.

SAMUEL J. EPARD AND EVERETT B. SAUTER, OF TOUCHET, WASHINGTON.

WINDSHIELD GUARD.

Application filed October 29, 1923. Serial No. 671,298.

*To all whom it may concern:*

Be it known that we, SAMUEL J. EPARD and EVERETT B. SAUTER, both citizens of the United States, residing at Touchet, in the county of Walla Walla and State of Washington, have invented certain new and useful Improvements in Windshield Guards, of which the following is a specification.

This invention relates to windshield guards and has as one of its objects to provide a guard that will prevent occupants of an automobile from coming in contact with the glass of a windshield on the sudden stoppage of the automobile from any cause, thus protecting the windshield.

Another object of the invention is to provide a means that will prevent mutilation and serious accident to occupants of an automobile from flying bits of glass, due to breakage from wrecking or other cause.

A further object of the invention is to provide a guard having a universal means for attaching that is adaptable to the greater number of makes and designs of windshields.

With these and other objects in view reference is now had to the accompanying drawings in which—

Fig. 1 is a rear elevation of a windshield showing the device attached;

Fig. 2 is an end view of a part of the windshield frame showing attaching means;

Fig. 3 is a rear elevation, enlarged, of the attaching means;

Fig. 4 is a plan view thereof; and

Fig. 5 is a sectional view of a fragment of the frame and glass of a windshield showing attaching hook in place.

Having reference to the drawings like numerals refer to like parts throughout the several views and the numeral 1 refers to the body of an automobile to which are attached upright posts 2 that support the top 3 and to which the windshield 4 is rotatably attached by means of the pivots 5.

The windshield consists of a frame 6 in which is mounted a glass plate 7, and where the windshield is composed of two parts, as shown in Fig. 1, will require protection for both parts.

As both sections are alike guards 8 will be identical and therefore the following description will apply to the upper section and its guard.

The guard is mounted behind the windshield and comprises a frame 9, formed preferably of substantial metal, and having a screen 10 rigidly attached to the frame in any approved manner.

The screen may be of a multiplicity of diagonally placed wires, or other material besides wire obviously may be used, and the placing may be horizontal or otherwise.

The lower side 11 of the frame is extended and is provided with hooks 12 formed on its ends. Other hooks 13 are attached to the top of the frame by bolts 14, and these hooks 13 with the hooks 12 support and secure the guard on the windshield.

The lower side of the frame has an adjustable means which consists of a flattened portion 15 on the short extension piece 16, and a corresponding flattened portion 17 on the long extension piece 18. Both of these flattened portions are provided with a slot 19 in which is mounted a bolt 20 whereby they may be drawn tightly together and held secure. By this means the hooks 12 may be drawn tightly against the frame, and aided by the hooks 13 securely hold the screen in place.

The hooks comprise a curved member 21, and a shank 22 that extends tangentially from the curved member.

By this sort of a hook and the fact that the frame 6 is wider than the glass 7 (see Fig. 5), the screen is withheld at a distance from the glass, and thus a pressure against the screen would have to take up all the slack between the guard and the glass, i. e. force the screen the above mentioned distance, before the glass could be broken by the impact of the occupant against it.

It is now obvious that the adjusting feature provides for rigidly attaching the guard to practically all windshields there being very little difference in their lengths, and where the sections vary in width they may be fit by making the screen to fully cover a narrow section when it will still afford protection on a wider section, or on a medium width section as shown in Fig. 1 where part 23 of the glass shows below the guard.

As many accidents occur wherein the occupant who sits beside the driver is maimed or even killed by being cut from glass from the windshield, these accidents being due to collisions mostly, the guard is preferably placed on the side in front of the occupant as the driver is protected to a great extent by the steering wheel.

Having thus described our invention, we claim—

1. In a windshield guard, the combination with a windshield comprising a frame and a glass mounted in the frame, of a guard mounted on the inside of the windshield and movable therewith, and comprising a screen mounted in a frame, said frame having one of its sides extended beyond the screen, means to adjust the length of said extended side, and to rigidly secure said side to the windshield frame, and means to secure the other side of the guard to the frame of the windshield.

2. In a windshield guard, the combination with a windshield comprising a frame and a glass mounted in said frame, of a guard mounted on the inside of the windshield and movable therewith, and comprising a screen mounted in a frame, said frame having one of its sides extended, and terminating in hooks, means to adjust the length of said extended side to rigidly secure said hooks against the windshield frame, and means to secure the other side of the guard to the frame of the windshield.

In testimony whereof we affix our signatures.

SAMUEL J. EPARD.
EVERETT B. SAUTER.